Jan. 9, 1968   J. E. ST. CLAIR ET AL   3,362,730
SIDE OUTLET COUPLING
Filed June 7, 1965   3 Sheets-Sheet 1
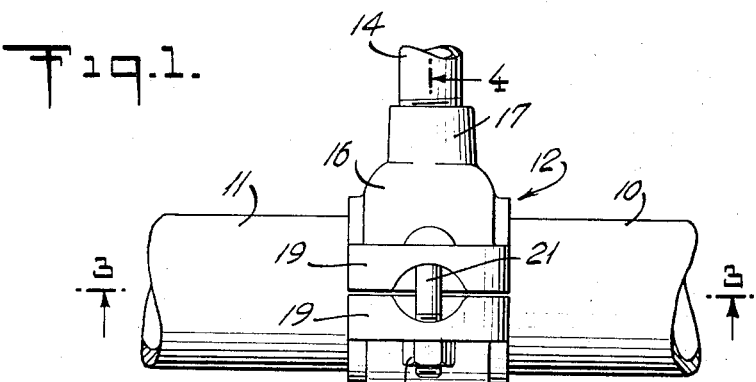
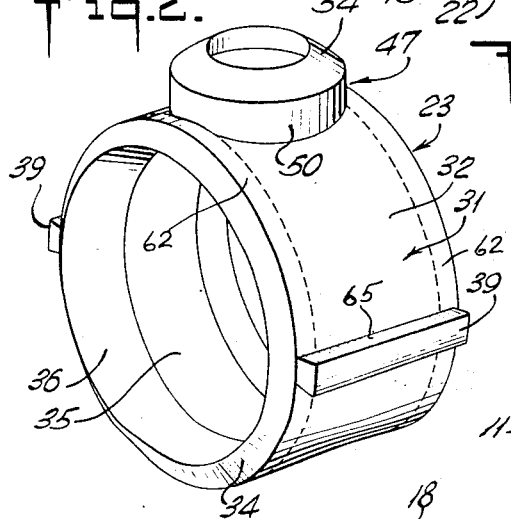
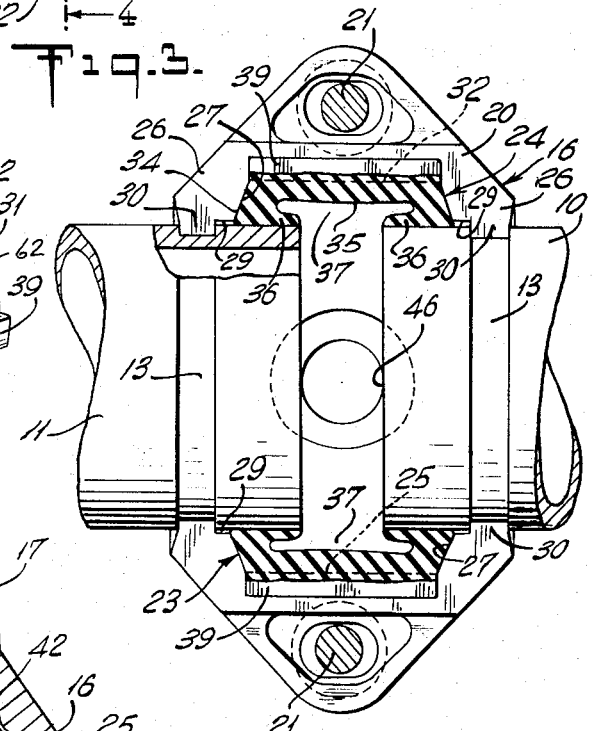
INVENTORS
Joseph E. St Clair
Frank X. Costanzo
BY
Albert M. Parker
ATTORNEY Jan. 9, 1968    J. E. ST. CLAIR ET AL    3,362,730
SIDE OUTLET COUPLING
Filed June 7, 1965    3 Sheets-Sheet 2
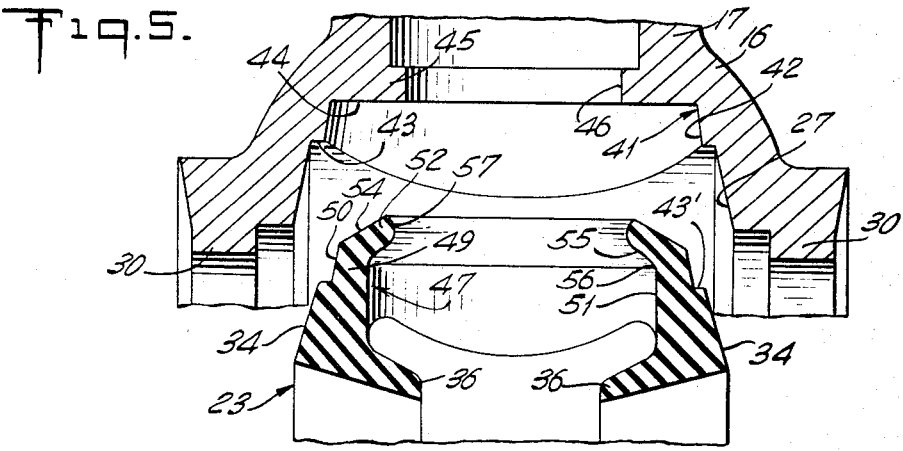
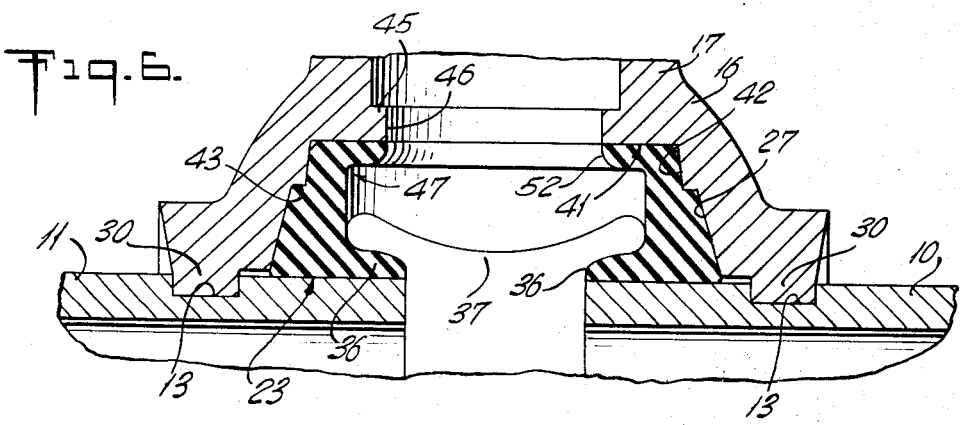
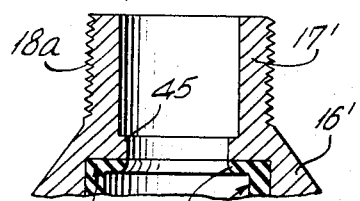    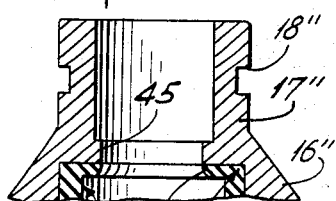
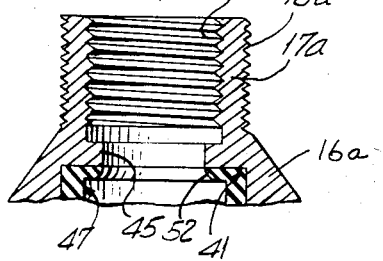    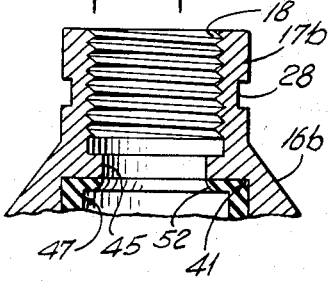
INVENTORS
Joseph E. St Clair
Frank X. Costanzo
BY
Albert M. Parker
ATTORNEY

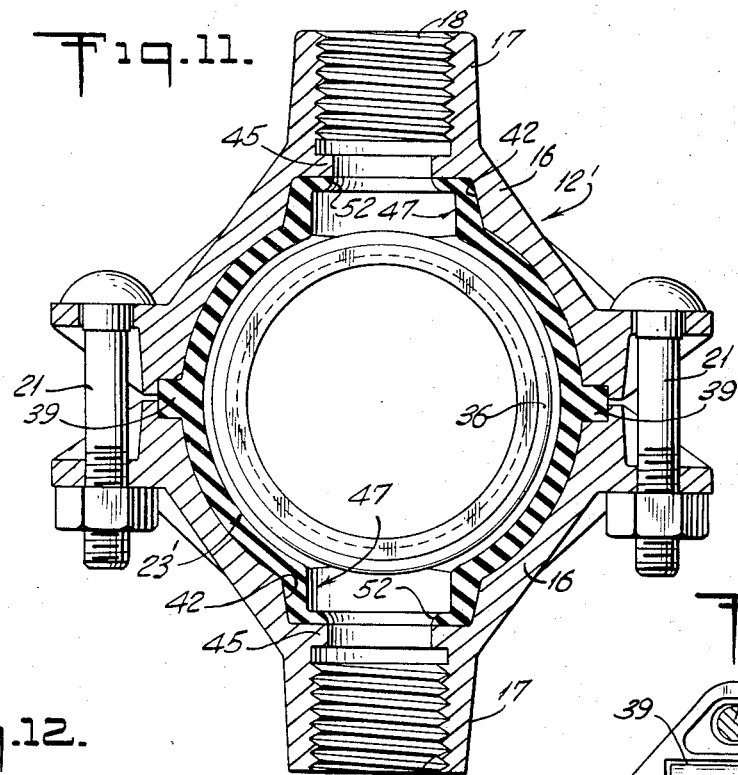
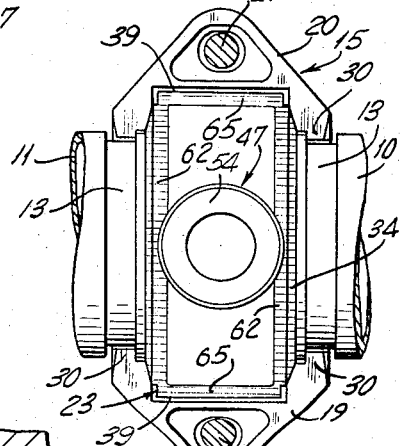
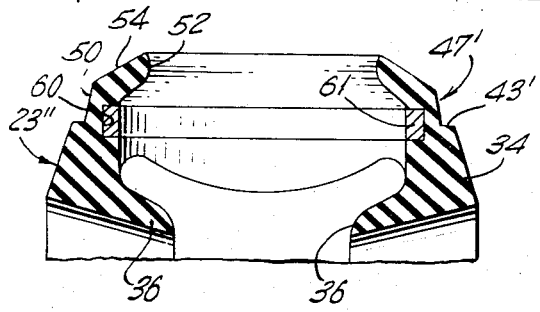
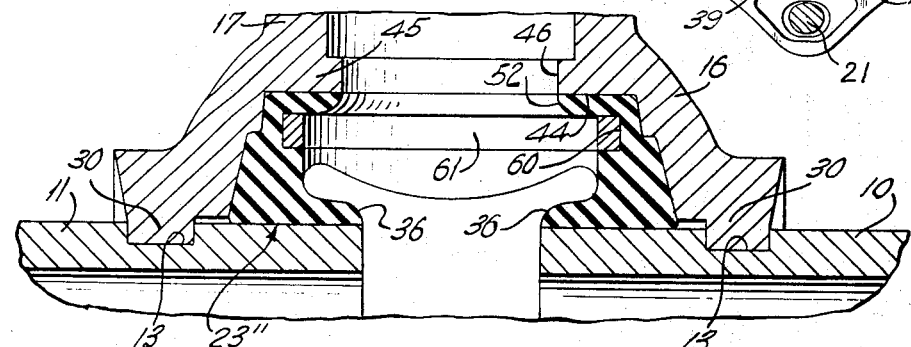
Fig. 11.
Fig. 12.
Fig. 13.
Fig. 14.
INVENTORS
Joseph E. St Clair
Frank X. Costanzo
BY
ATTORNEY

United States Patent Office 3,362,730
Patented Jan. 9, 1968

3,362,730
SIDE OUTLET COUPLING
Joseph E. St. Clair, Madison, and Frank X. Costanzo, Dunellen, N.J., assignors to Victaulic Company of America, Union, N.J., a corporation of New Jersey
Filed June 7, 1965, Ser. No. 461,684
5 Claims. (Cl. 285—108)

ABSTRACT OF THE DISCLOSURE

A quick disconnect side outlet coupling for pipes and conduits including a housing, a main annular sealing means in the coupling housing effecting a seal between main conduits and one or more branch conduits, the sealing between the conduits being augmented by the pressure within the conduits. The coupling is particularly characterized by the fact that the sealing between the main conduits is unaffected by the presence of the side outlet in the housing, and the positiveness of seal effected between the branch conduit, the housing, and the main conduits.

---

Quick disconnect couplings of the type wherein the ends of the conduits to be joined are slid axially into the coupling are widely used, as, for example, in irrigation systems and the like. In such coupling the sealing between the conduits and the sealing means within the coupling body is augmented upon the subjection of the interior of the thus formed pipe line to pressure. Pipe lines, including such quick disconnect couplings, frequently must be provided with branch pipes, usually of a smaller diameter than the main conduits. Such branch pipes can, of course, be connected directly to the pipe sections as by cutting a hole in such pipe section and welding the branch pipe thereto. This, however, usually requires the preforming of the branched pipe sections in the shop, since it requires the use of tools which ordinarily are not available in the field. Quick disconnect couplings of the type described provided with side outlet openings have been proposed in the past. Such couplings, however, have been complicated, difficult to assemble, and prone to leakage.

The side outlet coupling of the present invention is particularly characterized by its simplicity, its ease of use, and the positiveness with which sealing is effected between the coupling body and the branch or side outlet therein. In such coupling the sealing between the main annular sealing means in the coupling body and the main conduit parts remains unaffected by the presence of the side outlet in the sealing means and in the coupling body. Such latter sealing means becomes effective upon the assembly and pulling together of the coupling segments; additionally, the sealing means is made pressure responsive so that the sealing pressures between it and the portion of the coupling body cooperating therewith are increased upon subjection of the interior of the sealing means at the coupling to pressure.

The invention has among its objects the provision of an improved simplified pipe coupling of the side outlet type.

A further object of the invention lies in the provision of a novel side outlet pipe coupling of the quick disconnect type wherein the sealing between the coupling and the main pipes or conduits connected therewith is augmented by fluid pressure existing within the conduits.

Yet other objects of the invention lie in the provision of a side outlet coupling of the quick disconnect pressure sealing type wherein the body of the coupling is made of segments and the sealing between the sealing means of the coupling body at the side outlet and the portion of the body cooperating therewith is effected by assembling the segments of the coupling about the sealing means and pulling the segments together, and in such coupling, the provision of such sealing means which is pressure responsive.

Still another object of the invention lies in the provision of an improved side outlet coupling of the type defined immediately above and incorporating novel means whereby the annular sealing means within the coupling body is not only accurately located with respect thereto, but the sealing of the fluid conducting path from the interior of the coupling outwardly through the side outlet thereof is made additionally effective by such novel locating and securing means.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in side elevation of a first embodiment of side outlet coupling made in accordance with the invention, such coupling being shown connecting the ends of two main conduits and as having a smaller, branch conduit connected to the side outlet thereof;

FIG. 2 is a view in perspective of the novel annular sealing means employed within the body of such coupling;

FIG. 3 is a view in axial longitudinal section through the coupling of FIG. 1, the section being taken along the line 3—3 in the direction of the arrows, portions of the main conduits connected by the coupling being shown in elevation;

FIG. 4 is a view in transverse section through the coupling, the section being taken along the line 4—4 in the direction of the arrows in FIG. 1, certain of the parts being shown in elevation;

FIG. 5 is a fragmentary view in longitudinal section through the coupling of FIG. 1 in the vicinity of the side outlet opening through one coupling half, such portion of the sealing means being shown in its relaxed condition prior to its full assembly into such coupling half;

FIG. 6 is a view similar to FIG. 5 but with the fragmentarily shown sealing means fully assembled in the coupling half;

FIGS. 7–10, inclusive, are fragmentary views in section taken axially through the hollow boss of the segment of the coupling body to which a branch pipe is to be connected, such figures showing, respectively, four additional embodiments of means whereby the branch pipe may be connected to such segment;

FIG. 11 is a view in transverse section through a further embodiment of coupling in accordance with the invention, such coupling providing means for attaching two opposed branch pipes thereto, the section being taken in a manner similar to that of FIG. 4, certain of the parts being shown in elevation;

FIG. 12 is a fragmentary view in radial section through the access of the portion of a further annular sealing member at the location of the outwardly extending sealing portion thereof affording communication with a branch pipe;

FIG. 13 is a fragmentary view in axial radial section through a portion of the coupling body having a branch pipe connecting means incorporated therein, the annular sealing member of FIG. 12 being shown fully assembled in such portion of the coupling body; and FIG. 14 is a fragmentary view in plan of a joint between main pipes effected by the coupling of FIGS. 1–6, inclusive, but with the half of the body carrying the boss providing the side outlet of the coupling removed in order to illustrate the secondary sealage zone provided by the coupling around the zone of primary sealage at the side outlet through the annular sealing member of the coupling.

As is apparent from the above, there are shown herein a number of different embodiments of couplings and of annular sealing members cooperating therewith. Thus in FIGS. 1–6, inclusive, there are shown a first embodiment of coupling and of the annular sealing member therefor. FIGS. 7–10, inclusive, show four additional manners in which branch pipes may be connected to the coupling body of the invention. FIG. 11 illustrates a further embodiment of coupling, which may be called a cross-over, providing for the connection of two opposed branch pipes to the coupling. FIGS. 12 and 13 show a further embodiment of annular sealing means for use in the novel combination of coupling body of the sealing means of the invention.

In the embodiment of coupling shown in FIGS. 1–6, inclusive, the assembled coupling, generally designated by the reference character 12, is shown as connecting the ends of two main pipes or conduits 10 and 11 and as having a smaller branch pipe 14 connected thereto. Such assembly may be employed, for example, in irrigation lines wherein the conduits 10 and 11 are parts of the main supply line and the pipe 14 is connected thereto to supply an irrigation trench or a discharge nozzle. As will be seen hereinafter, the coupling 12 and the sealing means therefor are such that the coupling and the branch pipe 14 may be turned about the axis of conduits 10 and 11 without substantially disturbing the seal between the coupling and the main conduits or between the interior of the coupling and the side outlet therefor.

The body of the coupling is made, for example, of cast or forged metal segments 15 and 16 which form halves of an annular sealing member. The segment 15 of the coupling body, shown at the bottom in FIG. 1, is of generally the same construction as the segments of prior couplings of this type made without side outlet openings with the exception of the recesses therein partially receiving the novel locking and sealing means of the annular sealing member within the coupling, to be described. The second segment 16 of the coupling body, shown at the top in FIG. 1, is provided with a hollow boss 17 provided with internal threads 18 into which the end of the branch pipe 14 is threaded.

The segments 15 and 16 of the coupling body are held together in substantial engagement when assembled as shown in FIGS. 1 and 4. For this purpose pads project radially from the sides of the segments 15 and 16, the confronting pads of the two segments at the left in FIG. 4 being designated 19 and those to the right being designated 20. Each of pads 19 and 20 is provided with aligned holes through which bolts 21 extend, the bolts being preferably retained from rotation by oval portions beneath the heads thereof, such oval portions being received in elongated slots in the pads. Upon the tightening of nuts 22 on the lower ends of the bolts, segments 15 and 16 are drawn together into firm sealing engagement with the annular sealing means 23 within the thus formed annular body.

The annular sealing member 23 is shown in FIG. 2 in its relaxed, unassembled condition. Member 23 is received within a complementarily shaped recess 24 in the coupling body formed by the segments 15, 16, such recess being annular except at the side portions receiving the locking and sealing means of the member 23 and the portion 47 thereof cooperating with boss 17 of segment 16 to form the side outlet of the coupling. The generally annular recess 24 has a root 25 of circular cylindrical shape; each of segments 15 and 16 of the coupling body is provided with a radially inwardly projecting side flange 26 at the opposite ends of surface 25. The inner surface 27 of each of flanges 26 is in the shape of a frustum of a shallow cone having its apex located on the axis of the coupling outwardly of the central transverse plane through the coupling.

Axially beyond the inner edge of surface 27, each of coupling segments 15 and 16 is provided with a short circular cylindrical surface 29 which is joined by a transverse shoulder to a further smaller half-circular cylindrical member 30, aligned mating substantially half-annular members 30 at each end of the coupling forming annular keys which are lockingly received in transverse annular grooves 13 formed in the outer surfaces of pipes 10 and 11 near the ends thereof.

The annular sealing member 23, as noted, is formed so as to be substantially complementary to but as relaxed slightly larger than the space defined by the annular recess 24 and the side surfaces 27 thereof of the coupling body. Thus sealing element 23 has a body 31 with a generally circular cylindrical peripheral surface 32. The axially outer edges 34 of body 23 slant radially inwardly in an axially outwardly direction as shown so as to be accurately received within the slanting sidewalls 27 of the recess in the coupling body. Beyond each end of the main wall 35 of member 23, such wall is axially inturned to form flexible annular lips 36, as is shown in FIGS. 3 and 6. When conduits 10 and 11 are thrust within such lips of the sealing member and the housing halves 15 and 16 are pulled together thereabout, the lips are flexed inwardly thereby and firmly and sealingly engage the outer surfaces of the conduits adjacent their ends as shown in FIGS. 3 and 6. Upon subjection of the interiors of conduits 10 and 11 to fluid pressure, the fluid in the conduits fills the space 37 within the sealing member 23 and thus causes the annular lips 36 to be pressed still more firmly against the outer surfaces of the conduits.

For the purpose of locating and retaining the sealing member 23 accurately within the coupling body, member 23 is provided with two diametrically opposed outwardly projecting bars or lugs 39 integral therewith. Such lugs 39 have generally the same axial length as the main peripheral surface 32 of member 23 and are located in recesses in the housing segments 15, 16 which are formed of recess halves 40 formed in each of segments 15 and 16. The thus formed recesses are slightly smaller in section (FIG. 4) than the relaxed size of lugs 39 and of substantially the same axial length as the lugs. Thus when the segments of the housing are forcibly pulled together, as shown in FIG. 4, the lugs 39 are firmly and sealingly pressed against the ends, the radial, and the transverse surfaces of such recesses.

The hollow boss 17 on housing segment 16 lies with its axis at right angles to the central axial plane through the lugs 39 and recesses formed of recess parts 40. The root of the boss 17 is recessed at 41, the sides 42 of such recess being frusto-conical, as shown in FIGS. 4, 5, and 6. Above the upper end of the frusto-conical side 42, as it is shown in these figures, there is an annular transverse sealing surface 44 formed as the bottom of an annular flange 45 having a central hole 46 therethrough. As shown in FIGS. 2, 5, and 6 the sealing member 23 has an upstanding hollow boss 47 integral therewith. In the relaxed condition of the sealing means 23 shown in FIG. 2, the boss 47 has a frusto-conical outer surface 50 of small apex angle throughout its main extent and a frusto-conical radially outer end surface 54 of large apex angle.

The relationship between the side and end surfaces of recess 41 in segment half 16 and the relaxed sealing member 23 is best shown in FIG. 5. The relaxed angle of surface 50 of boss 47 approximately equals that of the side 42 of recess 41 in coupling half 16. As a result, when the parts are assembled as shown in FIG. 6, the sealing means 23 including the boss 47 thereon snugly fits within the recesses 24 and 41 of the coupling body. The interaction between the lug 39 and recesses 40, 40 in the coupling segments is such that upon assembling the annular sealing member 23 in the segments 15, 16 of the coupling body and pulling the segments together into the positions of FIG. 4 the surfaces 34 of the sealing member 23 are forcibly and sealingly thrust against the surfaces 27 of the coupling segment, and the outer peripheral surface 32 of member 23 is forcibly and sealingly thrust against the broad peripheral surface 25 of both coupling body segments 15 and 16.

During the described assembly of the parts the upper flange 52 of boss 47 is firmly thrust inwardly by flange 45 so as to lie snugly and sealingly against the transverse inner surface 44 of recess 41. Such deformation of the boss 47 is effected primarily by the bending of the outer flange 52 of boss 47 of sealing member 23 at its root 56. As fully assembled in the housing the boss 47 and its flange 52 provide an opening 57 therethrough which communicates with the annular space 37 within the coupling member 23. When the space 37 is subjected to fluid pressure, said pressure not only forces the sealing lips 36 of member 23 more firmly against the outer surfaces of conduits 10 and 11, but also thrusts the flange 52 of boss 47 more firmly against the sealing surface 44 of recess 41.

The lugs 39, as we have seen, coact with the recesses formed by recess halves forming recesses 40 in the housing segments in order accurately to maintain the sealing member 23 from displacement from its position shown in FIG. 4 despite the turning of any one of conduit 10, coupling 12, and conduit 11 with respect to each other. The lugs 39 and recesses 40, 40, however, have the further function of aiding the sealing of the coupling at the side outlet therein. Thus the forcible engagement between the generally radial surfaces of the recess halves 40 in the coupling parts 15 and 16 and the confronting surfaces of ribs 39 aid in preventing leakage of fluid from the coupling at the radially extending gap between the coupling halves between their confronting surfaces. Thus such lugs and recesses insure that the fluid conducting path in the coupling from the interior of the coupling to the branch conduit connected thereto is fluid tight.

FIGS. 7-10, inclusive, show four different manners in which a branch pipe may be connected to the hollow boss of the coupling segment corresponding to segment 16 of FIGS. 1-6, inclusive. In FIG. 7 the hollow boss 17' of the coupling segment 16' is providid with external threads 18a. In FIG. 8 the hollow boss 17" of the coupling segment 16" is provided with an external transverse annular groove 18" to receive the annular key portions of a conventional coupling which may be employed to connect a branch pipe to the boss 17".

In FIG. 9 the boss 17a of the coupling segment 16a is provided with internal threads 18, as in the first described embodiment, and with external threads 18a, as in FIG. 7. Thus with the construction of FIG. 9 a pipe may be screwed into the boss 17a or an internally threaded coupling or fitting may be screwed onto the external threads 18a thereof. In the construction of FIG. 10, the hollow boss 17b is provided with internal threads 18 and with an external transverse annular groove 28 thereabout by means of which a split coupling having an annular sealing member therewithin may be locked and sealed to the boss 17b in generally the same manner in which the coupling 12 of the first embodiment is locked and sealed to each of the pipes 10 and 11.

The embodiment of coupling shown in FIG. 11 is substantially the same as that of FIGS. 1-6, inclusive, with the exception that it employs two similar coupling segments which are constructed in the same manner as segment 16 of the first described body. Consequently, the parts of the coupling of FIG. 11 which are the same as those of FIGS. 1-6, inclusive, are designated by the same reference characters as those employed in connection with the first embodiment. The annular sealing gasket member, here designated 23', is provided with two opposed radially outwardly projecting hollow bosses 47 which sealingly cooperate with the surfaces of the recesses 41 of the respective segments. The boss 17 of each of the segments 16 is shown provided with internal threads 18, as in the first embodiment. It will be understood, however, that connection between the branch pipes and the coupling segments may be made in any of the manners illustrated in FIGS. 7-10, inclusive.

In FIGS. 12 and 13 there is shown a further embodiment of annular sealing means designated 23". Such sealing means has substantially the same structure and external configuration as the annular sealing member 23 of the first described embodiment, except for the inclusion of an internal reinforcing ring 61 in the boss 47' of the annular sealing member 23". Such reinforcing ring 61, which may be made of steel or other strong material, is snapped into and frictionally retained in an annular groove 60 in the boss 47' adjacent the root thereof. In the embodiment shown the groove 60 and the ring 61 therein are disposed so that the shoulder 43' on the exterior of the boss 47' lies substantially mid-way of the axial width of the ring.

When the annular sealing member 23" is fully assembled to a coupling segment 16, the radially outer flange 52 on the boss 47' is bent down so that its outer surface lies in snug sealing engagement with the inner surface 44 of the flange 45 of the segment. The reinforcing ring 61 thus underlies the flange 52 and retains it in sealing contact with surface 44. This construction is particularly advantageous when the conduit system and the coupling connected thereto may, at times, be subjected to subatmospheric pressure which might otherwise tend to pull the flange 52 inwardly to free it from sealing engagement with surface 44.

The secondary sealage around the side outlet of the fitting, referred to above, is illustrated in FIGS. 2 and 14. As shown in these figures, there is an unbroken annular zone 62 of the outer circular cylindrical surface 32 at each end of the resilient annular sealing member 23. Such zone 62 extends to and outwardly of an imaginary line, shown as dash line 64 in FIG. 2. As is apparent in FIG. 14, the zones 62 extend to and intersect the broad generally radial surfaces 65 of the lugs 39. When the segments of the coupling body are assembled upon the main pipes 10 and 11 and are pulled strongly together by bolts 21, there is produced a secondary sealage, shown in FIG. 14, by the engagement of the zones 34, 62 and 65 of the resilient annular sealing member 23. Thus should there occur any leakage of fluid at the location of primary sealage, that is, the surfaces of the hollow boss 47 and of recess 41, the leaked fluid is prevented from escaping from the coupling, since it cannot flow outwardly past the described zone of secondary sealage.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

What is claimed is:

1. A quickly connectable and disconnectable side outlet pipe coupling comprising opposing first and second housing segments forming a coupling housing, means for drawing the housing segments toward each other along substantially a straight line and for securing the segments together in assembled relationship, the two segments when thus assembled presenting a first axially extending recess having a generally circular cylindrical main peripheral surface, the first segment having a radially outwardly extending hollow boss thereon disposed substantially centrally of the axial and peripheral extents of the first segment, means on said hollow boss adapted for the connection of a branch pipe thereto so as to communicate with the passage through the hollow boss, the first segment of the housing having a second recess therein communicating with the first recess, and lying radially inwardly of the hollow boss in substantial alignment with and communicating with the passage through said boss, a generally annular resilient sealing member disposed within the first recess and having a generally circular cylindrical main outer surface complementary to and adapted to form a seal with the main peripheral surface of the first recess, said sealing member having formations at its axially opposite ends adapted to receive and effect sealing with the ends of main pipes to be joined by the coupling, a hollow outwardly extending resilient boss on the first portion of the sealing member, which lies within the first segment of the housing, said resilient boss having an outer surface which is generally complementary to, and is adapted to be received within, the said second recess in said first segment of the housing and, when thrust radially outwardly, to form a seal between its peripheral surface and the confronting surface of the second recess, and means to thrust the resilient boss on the sealing member radially outwardly into the second recess when the segments of the coupling housing are drawn together, said last named means comprising radially outwardly projecting lugs on the sealing member at opposite sides thereof at locations angularly corresponding to the ends of said first and second segments, said lugs extending symmetrically axially of the sealing member throughout at least a substantial part of the axial length thereof, said first and second segments of the housing having parts of radially and axially extending third recesses in the confronting surfaces at their ends, the third recesses receiving the respective lugs on the sealing member when the segments of the coupling body are assembled with the sealing member therewithin, the parts being so constructed and arranged that, when pipe ends are in place in the opposite ends of the sealing member in the coupling housing and the means drawing the segments together are fully tightened, engagement between the lugs and the parts of the third recesses on said second housing segment thrusts the first portion of the sealing member into sealing engagement with the inner surface of the first recess in the first segment and through said first portion of the sealing member thrusts the resilient hollow boss thereon fully into the second recess in the said first housing segment in sealing engagement with the surface of said second recess.

2. A coupling as claimed in claim 1, wherein the means for drawing the housing segments together and for securing them together in assembled relationship comprises oppositely outwardly extending ears on the ends of the housing segments, the ears on one segment being disposed in alignment with and spaced from corresponding ears on the other segment, and clamping means cooperating with each pair of opposed ears to draw the segments toward each other.

3. A coupling as claimed in claim 1, wherein the resilient boss on the annular sealing member has an annular end flange which, when said resilient boss is relaxed, is of frusto-conical shape converging radially outwardly at a large angle, the second recess has a radially outer end surface which is disposed substantially transversely to the axis of the boss on the first segment of the housing, the annular end flange of the resilient boss when fully operatively mounted within the second recess lying transversely to the radial axis of the resilient boss and with its outer end surface in engagement with the radially outer annular end surface of the second recess to form a first seal disposed between the boss on the first housing segment and the interior of the annular sealing member, and wherein the second recess is of frusto-conical shape converging radially outwardly at a small angle, and the resilient boss on the annular sealing member when relaxed has a shape complementary to that of the second recess but slightly larger than such recess whereby to form a second seal disposed between the boss on the first housing segment and the interior of the annular sealing means when the resilient boss is forcibly thrust fully into the second recess.

4. A coupling as claimed in claim 3, comprising flanges on the radially outer ends of the housing segments disposed to define the outer ends of the said parts of the third recesses, corresponding flanges on opposite ends of the respective housing segments confronting and being somewhat spaced from each other when the housing segments are pulled together into their operative positions relative to each other.

5. A coupling as claimed in claim 4, wherein the root of the resilient boss on the annular sealing member is disposed appreciably spaced from the ends of the annular sealing member, and the lugs on the annular sealing member extend throughout substantially the entire axial length of the annular sealing member, and, in addition to the said first and second seals between the boss on the first housing segment and the interior of the annular sealing member there is a third such seal, said third seal surrounding the resilient boss and being formed by engagement between inner surfaces of the parts of the first and third recesses in the first housing segment and the parts of the outer main surface of the first portion of the annular sealing member at the ends thereof outwardly beyond the root of the resilient boss thereon and the surfaces of the lugs which engage the parts of the third recesses which lie in the first housing segment.

References Cited
UNITED STATES PATENTS

| | | | |
|---|---|---|---|
| 896,333 | 8/1908 | Smith | 285—197 X |
| 1,300,414 | 4/1919 | Klell | 285—108 X |
| 2,351,141 | 6/1944 | Merrill | 285—197 |
| 2,898,128 | 8/1959 | Shohan | 285—198 X |
| 2,901,271 | 8/1959 | Zoldak | 285—373 X |
| 2,923,308 | 2/1960 | Shohan | 285—5 X |
| 3,054,629 | 9/1962 | Piatek | 285—373 |
| 3,153,550 | 10/1964 | Hollett | 285—373 X |

FOREIGN PATENTS

| | | |
|---|---|---|
| 1,256,926 | 5/1959 | France. |
| 5,464 | 3/1908 | Great Britain. |

CARL W. TOMLIN, *Primary Examiner.*

R. G. BERKLEY, *Assistant Examiner.*